(12) United States Patent
Gruner

(10) Patent No.: US 10,744,747 B2
(45) Date of Patent: Aug. 18, 2020

(54) REPAIRING A CONTOURED COMPOSITE PANEL

(71) Applicant: The Boeing Company, Chicago, IL (US)

(72) Inventor: Eric G. Gruner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1351 days.

(21) Appl. No.: 14/810,375

(22) Filed: Jul. 27, 2015

(65) Prior Publication Data

US 2017/0029088 A1 Feb. 2, 2017

(51) Int. Cl.
| | | |
|---|---|---|
| *B23P 6/00* | (2006.01) | |
| *B64F 5/40* | (2017.01) | |
| *B32B 27/20* | (2006.01) | |
| *B32B 43/00* | (2006.01) | |
| *B32B 37/18* | (2006.01) | |
| *B32B 3/26* | (2006.01) | |
| *B32B 27/18* | (2006.01) | |
| *B29C 73/10* | (2006.01) | |
| *B32B 3/12* | (2006.01) | |
| *B32B 27/34* | (2006.01) | |
| *B32B 7/12* | (2006.01) | |
| *B32B 9/00* | (2006.01) | |
| *B32B 29/00* | (2006.01) | |
| *B32B 37/14* | (2006.01) | |

(52) U.S. Cl.
CPC ............... *B32B 27/20* (2013.01); *B23P 6/00* (2013.01); *B23P 6/002* (2013.01); *B29C 73/10* (2013.01); *B32B 3/12* (2013.01); *B32B 3/263* (2013.01); *B32B 3/266* (2013.01); *B32B 7/12* (2013.01); *B32B 9/007* (2013.01); *B32B 27/18* (2013.01); *B32B 27/34* (2013.01); *B32B 29/002* (2013.01); *B32B 37/182* (2013.01); *B32B 43/00* (2013.01); *B64F 5/40* (2017.01); *B32B 37/146* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2266/02* (2013.01); *B32B 2305/024* (2013.01); *B32B 2305/08* (2013.01); *B32B 2605/18* (2013.01); *B32B 2607/00* (2013.01)

(58) Field of Classification Search
CPC .... B29C 73/10; B32B 43/00; Y10T 29/49726
See application file for complete search history.

(56) References Cited

U.S. PATENT DOCUMENTS 4,588,626 A * 5/1986 Cologna ................. B29C 73/14
156/94
5,033,949 A * 7/1991 Jewett ................. E04G 23/0203
425/12

(Continued)

FOREIGN PATENT DOCUMENTS

EP 0180865 A2 5/1986

*Primary Examiner* — Jason L Vaughan
*Assistant Examiner* — Amanda Kreiling
(74) *Attorney, Agent, or Firm* — Kolisch Hartwell, P.C.

(57) ABSTRACT

A method for repairing damage caused to a curved composite-material panel may include removal of a sector including through-thickness damage, installation of a patch performed from an exterior side of the panel, buildup of the void caused by removal of the sector, and installation of one or more composite repair plies.

20 Claims, 13 Drawing Sheets

(56) References Cited

U.S. PATENT DOCUMENTS

| | | | |
|---|---|---|---|
| 7,069,830 B1* | 7/2006 | Meyer | E04C 2/365 |
| | | | 29/897.1 |
| 8,356,649 B2 | 1/2013 | Cacace et al. | |
| 2007/0044306 A1* | 3/2007 | Szela | B23K 9/04 |
| | | | 29/889.1 |
| 2013/0152389 A1* | 6/2013 | Cappelli | B29C 73/10 |
| | | | 29/889.1 |
| 2014/0141190 A1* | 5/2014 | Shigetomi | B29C 73/06 |
| | | | 428/63 |

* cited by examiner

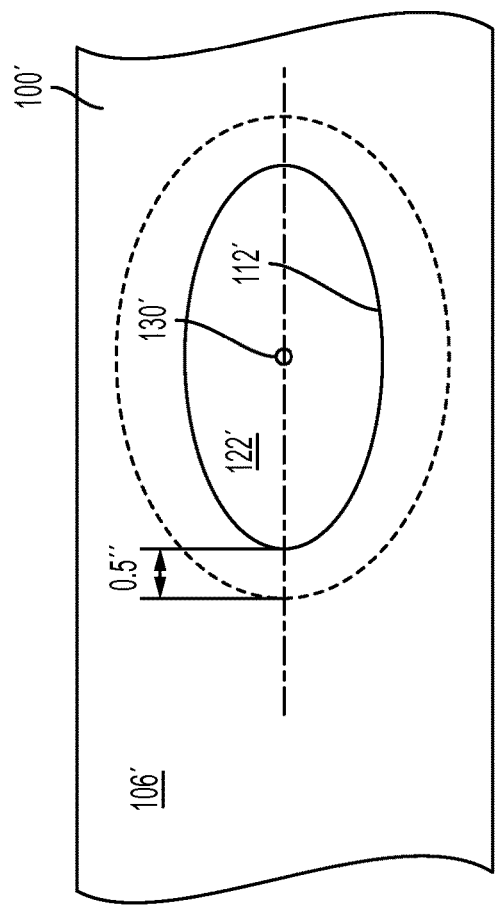
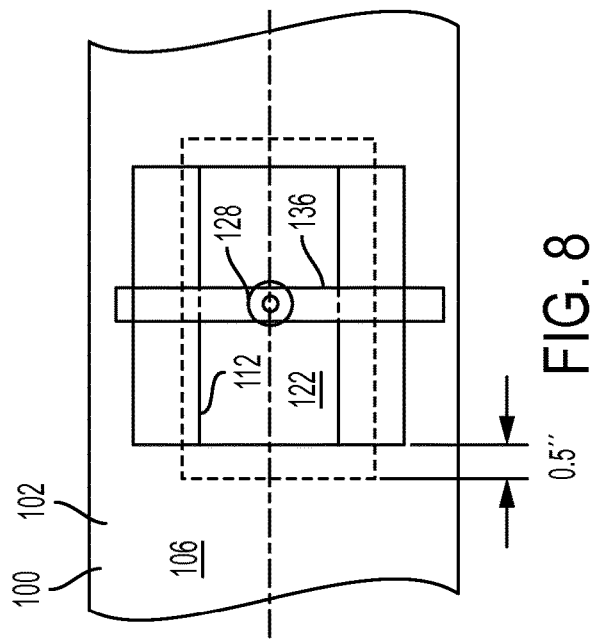
FIG. 7
FIG. 8

REPAIRING A CONTOURED COMPOSITE PANEL

FIELD

This disclosure relates to systems and methods for repairing damaged composite-material panels. More specifically, the disclosed embodiments relate to repairing a contoured region of a composite-material panel, such as the leading edge of a composite-material airfoil.

INTRODUCTION

Many structures and components of modern aircraft are constructed of composite materials, such as carbon fiber. These structures are typically manufactured using carbon fiber-reinforced polymer (CFRP) panels. The panels can be laminar, such that several plies are bonded together to form a panel.

CFRP panels provide lightweight, but strong solutions for various aspects of aircraft design, including portions of the aircraft that are subjected to the environment. As with any such aircraft components, these CFRP structures may be damaged from time to time by foreign objects, lightning strikes, and the like. To avoid the costly step of completely replacing one or more CFRP panels, various repair methods have been devised.

However, these methods are typically directed to repairing relatively flat panels and/or panels that are easily accessible from more than one side. Certain aspects of aircraft, especially newer aircraft, do not lend themselves to these methods. For example, some airfoil structures include panels that are highly contoured or sharply curved, and/or only permit access to an exterior surface. Accordingly, methods are needed to efficiently and effectively repair these contoured composite-material structures.

SUMMARY

The present disclosure provides methods, systems, and devices for repairing damaged composite-material panels. In one embodiment, a method for repairing a contoured composite-material structure may include identifying a damaged area of a vertex region of a curved, composite-material panel, the panel defining an exterior surface, an interior surface, and a thickness; removing a full-thickness portion of the damaged area, forming a void in the vertex region and an aperture in the panel; inserting a flexible patch into the aperture; covering the aperture by affixing the patch to the interior surface of the panel; attaching a shaped core in the void, the shaped core having an outer contour corresponding to the vertex region; and removing remaining portions of the damaged area by tapering the exterior surface of the panel adjacent the void and distal to the vertex region.

In another embodiment, a method for repairing a leading edge of an airfoil may include identifying a damaged area of a leading edge of a hollow airfoil, the leading edge including a curved panel of composite material and defining a thickness extending from an exterior surface of the panel to an interior surface of the panel; removing a sector of the leading edge corresponding to the damaged area, the removed sector including the thickness of the panel, thereby forming a void in the leading edge and an opening in the airfoil; inserting a flexible patch through the opening, the patch being larger than the opening; securing the patch to the interior surface of the leading edge, such that the patch covers the opening; and affixing a shaped core in the void formed by removing the sector.

In another embodiment, a repaired airfoil structure may include a composite-material leading edge of a hollow airfoil from which a sector has been removed to form a void in the composite material of the leading edge and a hole in the airfoil; a dam covering the hole in the airfoil, the dam including one or more layers of flexible material affixed to an interior periphery of the hole; and a shaped core fixed in the void by a fixative; wherein areas of the airfoil adjacent the void and distal to the leading edge are tapered.

In another embodiment, a repair kit for repairing a damaged composite-material leading edge of an airfoil may include a flexible patch configured to overlap the periphery of an opening in a leading edge of a curved panel by at least approximately 0.5 inches on all sides, the panel comprising a plurality of plies of composite material; an adhesive for attaching the patch to an inner surface of the panel; and a clamp including a removable fastener and a bracing member configured to span the opening in the leading edge, the fastener being attachable to a hole in the patch and to the bracing member, such that the clamp is secured against the panel by the bracing member and pulls the patch against the inner surface of the panel.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 7 is a front elevation view of an illustrative airfoil with an elliptical sector removed and patched.

FIG. 8 is a front elevation view of an illustrative airfoil with a rectangular sector removed and patched.

DESCRIPTION

Overview

Figure 1:
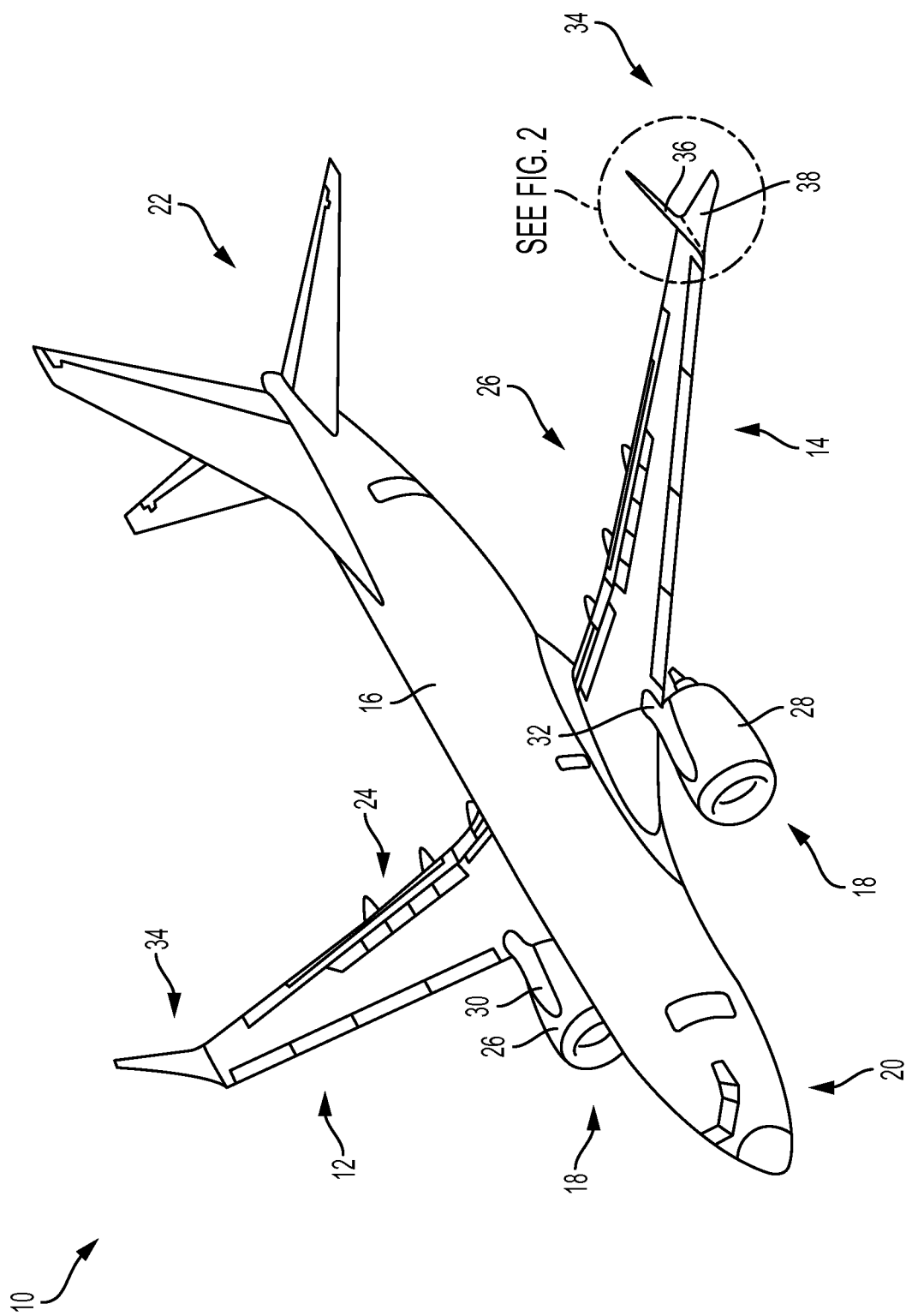
FIG. 1 is an isometric view of an illustrative aircraft having one or more structures suitable for use with methods and apparatus in accordance with aspects of the present disclosure.

Various embodiments of a repair method for contoured composite material panels (e.g., airfoil structures), as well as related structures and devices, are described below and illustrated in the associated drawings. Unless otherwise specified, a panel repair method and/or its various steps and components may, but are not required to, contain at least one of the process steps, structures, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar repair methods and related devices. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

The illustrative repair methods, systems, and devices described herein generally apply to repairs of composite panels such as those found on certain airfoils. Composite materials, commonly referred to as "composites", are tough, lightweight materials made from two or more constituent materials, that when combined, produce a material with physical and/or chemical properties different from individual constituent materials. Composites are commonly used to construct vehicles such as airplanes, automobiles, boats, bicycles, and/or components thereof, and non-vehicle structures such as buildings, bridges, swimming pool panels, shower stalls, bathtubs, storage tanks, and/or components thereof. Accordingly, repair methods of the present disclosure may apply to any of these structures.

A composite may be desirable for various reasons. For example, a composite panel forming a portion of an airfoil, such as a winglet, may be stronger, lighter, and/or less expensive when compared to alternative non-composite materials such as fiberglass or metal.

Aircraft are being designed and manufactured with greater and greater percentages of composite materials. Composite materials may be used in aircraft to decrease the weight of the aircraft. This decreased weight may improve payload capacities and fuel efficiencies. Composite materials may provide longer service life for various components in an aircraft. Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

Conventional composite materials typically include glass, carbon, or polyaramide fibers in a matrix of epoxy or another type of resin. Composite materials described herein may include carbon fiber reinforced polymers (CFRP).

Composite components are typically created by laying up composite materials on a tool, e.g., by layering plies of composite. This tool provides a form for the shape of the composite component. Composite materials are laid up on the tool in the shape of the composite component. To more permanently affix adjacent plies together, the layered plies may be compacted, or compressed, together, utilizing any suitable method and at any suitable and various times during the construction of a fiber reinforced composite structure. This compression of two more laminated layers is referred to as compaction, or as compacting, of the plies. The curing and compacting process typically involves the use of heat and in some cases, heat, pressure, and/or vacuum.

In general, a contoured composite panel refers to a curved or otherwise contoured structure configured such that repair personnel or equipment only have access to one side of the structure, typically the damaged side. For example, the leading edge area of a hollow airfoil (e.g., a wing, winglet, stabilizer, etc.) may be curved (e.g., sharply curved), and the inner surface of the hollow structure may be effectively inaccessible due to the curvature, small size, and/or intervening structures.

Such a panel may be damaged during normal operation, such as when an airfoil is struck by a foreign object, by lightning, or the like. This type of damage commonly occurs to the leading edge or nose of the airfoil. Previously, due to inaccessibility of the inner surface of the damaged panel, the only efficient and practical way to repair such damage would be to completely replace the panel or airfoil. However, by following methods and/or using devices and systems in accordance with the present disclosure, a complete, effective, and efficient repair may be performed from only one side of the panel.

A method for repairing a curved or contoured panel comprising composite material may include first determining an extent of the damage. Because a significant portion of the damage is typically within the multi-layered panel and not visible to the naked eye, an ultrasonic testing device may be utilized to identify and locate the damage. Additionally, at this initial stage, a mold or casting may be made of the panel to memorialize the shape and configuration of the damaged area. This mold or casting may be used later as a guide when rebuilding the area.

After the damage has been identified, a portion or sector of the damaged panel may be removed. For example, all of the through-thickness damage may be removed, leaving a hole in the panel. A portion of the damaged region (e.g., areas having shallow damage) may be left in place to function as a backstop or bracing surface for a clamping device used in intermediate steps.

A flexible repair patch may be inserted into the hole and affixed to the interior wall of the panel. The repair patch may be non-metallic, and may comprise a pre-cured composite material. In some examples, the repair patch may comprise a thin metal layer, such as titanium. A clamp device may be utilized to hold the patch in the hole, for example during the curing of an adhesive used to fix the patch in place. The patch may be configured and/or sized to seal the hole, such that the patch forms at least a portion of a dam. The patch may be used to seal the hole for purposes of drawing a vacuum around the repair area in later steps. Alternatively or additionally, the patch may function as a surface on which additional repair structures may be built. Accordingly, the patch may not need to be structural in nature. In other words, it may not be necessary for the patch to form a structural or functional portion of the airfoil when repairs are complete.

A lightweight, shaped core, also referred to as sacrificial tooling and/or a shaped block, may be attached in the void formed by removal of the sector of damaged panel. This may be accomplished by placing the shaped core in the void and using an adhesive to secure the core in place and fill any gaps or cavities around the core. Any suitable adhesive may be used. For example, a potting compound may be used. The size and shape of the core may correspond to or be determined using the mold or casting (a.k.a., surface tool) created in an earlier step. The expected thickness of later repair materials may also be taken into account.

Once the shaped core is secured in place and the adhesive has cured sufficiently, remaining damage may be removed. For example, the exterior surface of the damaged areas of the panel may be tapered back by sanding or scarfing. Removal of all damaged areas may be verified or confirmed using ultrasonic testing/inspection.

Repairs may then be completed using any suitable aerospace industry technique(s). For example, the splash plaster surface tool created earlier in the process may be used to determine the final shape of the repair surface, and layers of composite material may be compacted onto the shaped core and tapered surface. In this manner, the surface may be built up and then sanded down to conform to the desired curvature or aerodynamic shape.

Repair methods in accordance with aspects of the present disclosure enable effective and efficient repairs of contoured composite-material panels, even when said panel is only accessible from one side.

Examples, Components, and Alternatives

The following sections describe selected aspects of exemplary repair methods and devices, as well as related systems and/or processes. The examples in these sections are intended for illustration and should not be interpreted as limiting the entire scope of the present disclosure. Each section may include one or more distinct disclosures, and/or contextual or related information, function, and/or structure.

Figure 2:
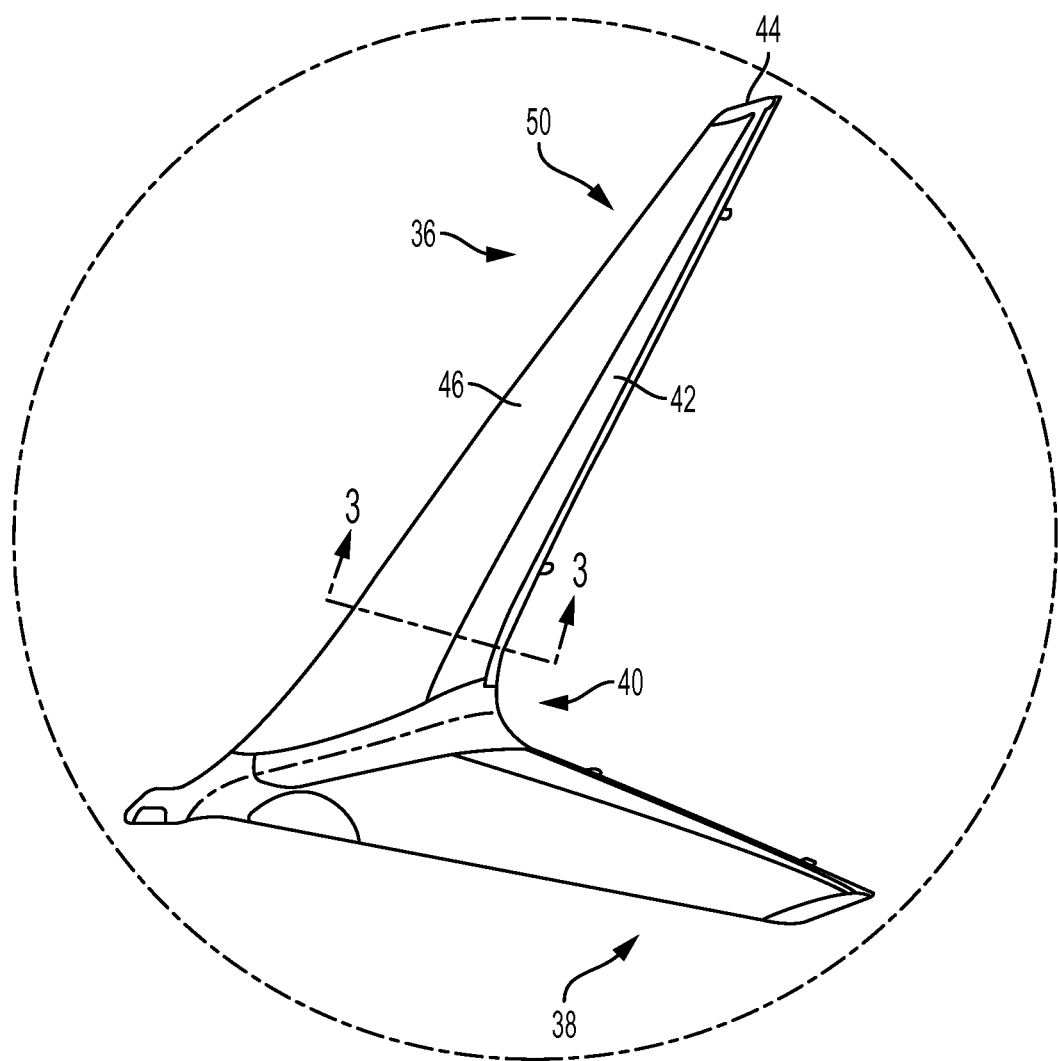
FIG. 2 is an isometric view of an illustrative winglet portion of the aircraft of FIG. 1.
Figure 3:
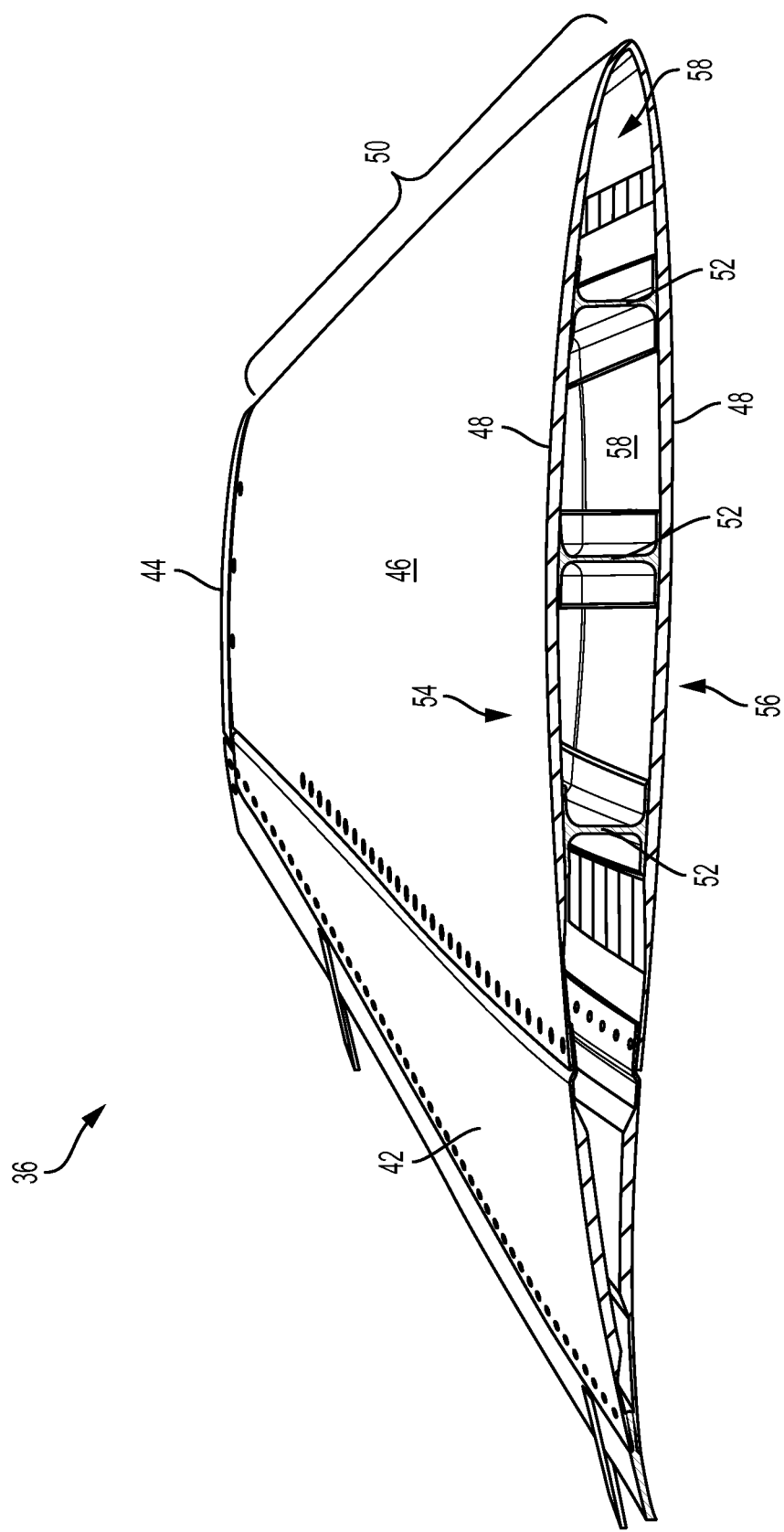
FIG. 3 is an isometric sectional view taken at line 3-3 of FIG. 2.

Illustrative Airfoils:

As shown in FIGS. 1-3, this section describes an illustrative airfoil on which one or more of the repair methods described herein may be performed.

FIG. 1 is a perspective view of an illustrative aircraft 10. FIG. 2 is a magnified view of a winglet portion of the aircraft of FIG. 1. FIG. 3 is a sectional isometric view of one of the winglets shown in FIG. 2, taken at line 3-3.

With reference to FIG. 1, aircraft 10 is an illustrative commercial jet aircraft having a pair of wings 12 and 14, a fuselage 16, and a propulsion system 18. Fuselage 16 includes a nose portion 20 at the forward end of the fuselage, and a tail portion 22 at the aft end of the fuselage.

Wings 12 and 14 may include any suitable airfoil structures configured to provide lift to the aircraft. Wings 12 and 14 are shown in FIG. 1 as elongate structures extending from a lower portion of fuselage 16 in a swept wing, tapered planform. In other examples, wings may be straight or delta-shaped. In other examples, wings may be trapezoidal, constant, elliptical, semi-elliptical, or other configurations known in the art. Wings 12 and 14 may include control surfaces such as ailerons and flaps. For example, flaps 24, 26 may be included on each wing. Flaps may include any suitable pivoting structure on the trailing edge of a wing, and may be configured to alter the lift characteristics of the wing. Flaps may be pivotable about a fixed axis. In other examples, flaps may pivot through an arc.

Fuselage 16 is the main body of the aircraft, and may include any suitable central structure configured to hold a crew, one or more passengers, and/or cargo. FIG. 1 shows an elongate, generally cylindrical fuselage configured for carrying passengers.

Propulsion system 18 may include two turbofan engines 26, 28, shown in FIG. 1 attached to wings 12 and 14 by pylons 30 and 32, respectively. In other embodiments, engines 26 and 28 may be carried or attached to fuselage 16 or other aircraft structures such as tail portion 22. More or fewer engines may be included, and other types of engines (e.g., turboprop) may be used.

Returning to wings 12 and 14, each wing may include one or more winglets 34 at a distal end, to improve efficiency. For example, as shown in FIGS. 1 and 2, wing 14 includes a pair of winglets 36 and 38. In this example, winglet 36 extends transversely in a generally upward direction from the main wing. Winglet 38 extends from a common base portion 40 at a shallow downward angle from the main wing. Accordingly, winglets 36 and 38 form an acute angle with respect to each other.

Each winglet may have a substantially similar construction, although winglet 36 may be substantially longer than winglet 38. With reference to FIGS. 2 and 3, winglet 36 will now be described in more detail, with the understanding that the description also applies generally to corresponding features of winglet 38.

In general, winglet 36 may be described as a blade or airfoil, and may include a trailing edge portion 42, a tip portion 44, and a body portion 46. Trailing edge portion 42 may be made of panelized fiberglass, while tip portion 44 may comprise metal (e.g., to facilitate lightning diversion). Body portion 46, however, includes a composite-material panel 48 folded or curved back onto itself such that a curved airfoil shape is achieved, with a curved leading edge 50 (also referred to as a nose). A plurality of stiffeners 52 may run axially within the airfoil structure of body portion 46, connecting an upper wall 54 to a lower wall 56 and providing structural support for the airfoil shape. Stiffeners 52 may include I-beam-like members, as shown in FIG. 3, and may also be formed of composite materials. Body portion 46, including panel 48 and stiffeners 52, may be manufactured and cured in one process, resulting in a substantially monolithic structure. From this description, it may be seen that winglet 36 includes a hollow airfoil having a generally closed interior 58. Due to the relatively small size and enclosed nature of interior 58, it may also be appreciated that there is no access to panel 48 from interior 58. In other words, the interior-facing surfaces of panel 48 are effectively inaccessible from a repair standpoint.

As mentioned above, damage to airfoils such as winglet 36 typically occurs in the area of leading edge 50. Because this area or region includes the portion of a panel that forms a curve, the leading edge may be interchangeably referred to as a vertex region. Panels having other contours and/or multiple curves may be repaired using methods, materials, and devices described herein. In general, repair methods in accordance with aspects of the present disclosure may be suitable for a damaged area of a vertex region of a curved, composite-material panel.

Detailed Illustrative Method of Repair and Intermediate Structures:

As shown in FIGS. 4-12, this section describes a method, related structures, and devices for repairing a vertex region of a curved composite-material structure. Specifically, aspects of the repair of a damaged leading edge of an illustrative airfoil are described in detail and illustrated in the associated drawings.

Figure 4:
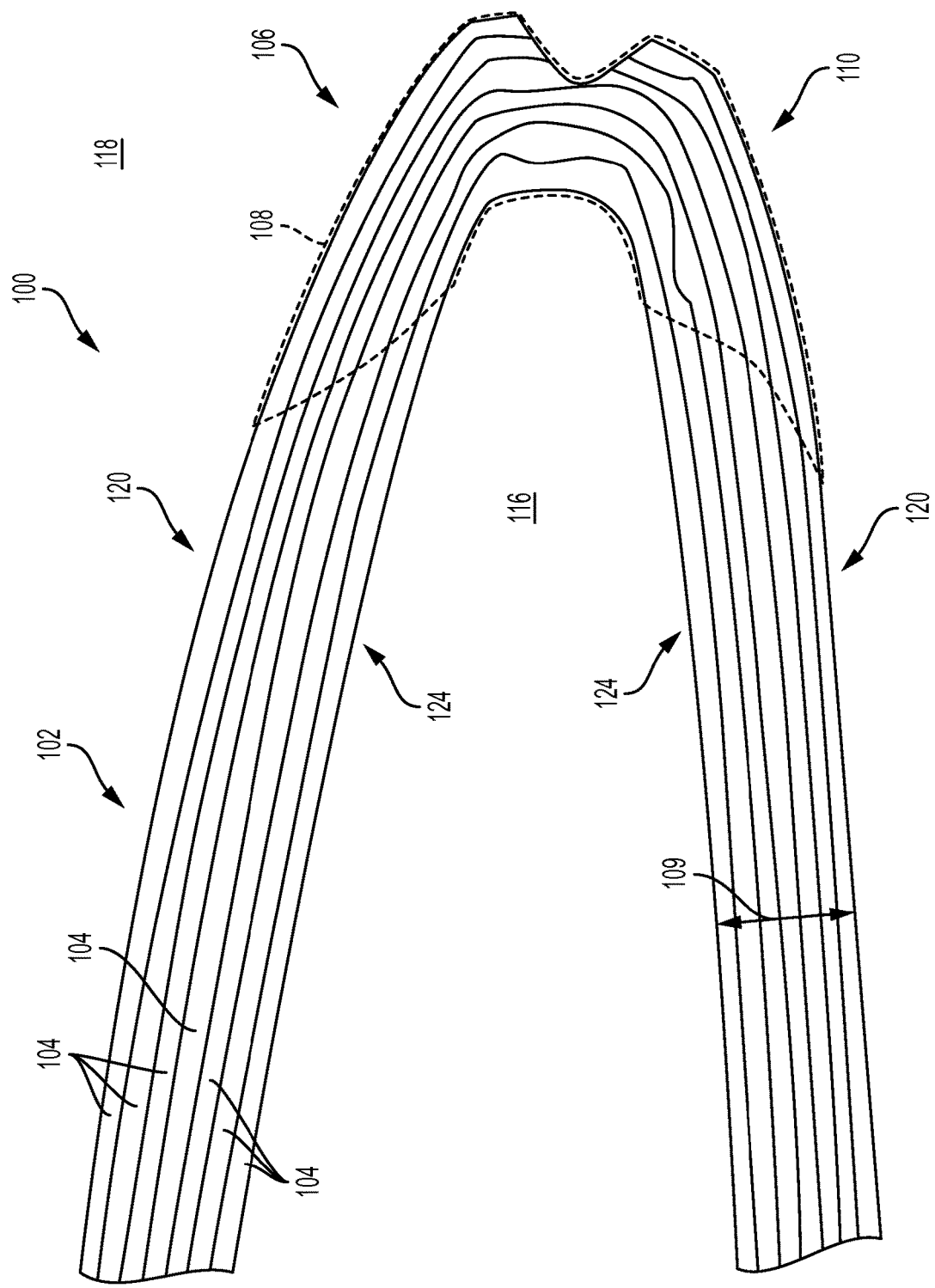
FIG. 4 is a sectional side view of a damaged leading edge portion of an illustrative airfoil.

Referring now to FIG. 4, a leading edge portion of an illustrative airfoil 100 is shown in sectional side view. Airfoil 100 may include any suitable structure having a curved composite-material panel. For example, airfoil 100 may be an example of winglet 36, described above. Airfoil 100, as shown in FIG. 4, includes a curved composite-material panel 102 comprising a plurality of composite-material layers 104. Seven layers 104 are illustrated in FIG. 4. However, any suitable number of layers may be present, with suitable orientation. Layers 104 may be interchangeably referred to as plies.

Panel 102 includes a leading edge 106, also referred to as a vertex region. In this example, an impact has resulted in a damaged area 108, in which some or all of layers 104 have been damaged. As shown in FIG. 4, damage has occurred to varying degrees and depths in different parts of area 108, with some damage being through a full thickness 109 of panel 102. Initial steps of the repair process may include making a splash plaster casting of leading edge 106 around damaged area 108, to memorialize the damage and the general shape of the airfoil in that location. Another casting may be prepared, or this casting may be modified, to recreate the ideal or desired contour of the airfoil. Any of these castings may be used in later steps to restore the airfoil to the original contour.

Additionally, testing or inspection may be performed to determine or assess the extent of the damage in area 108. Any suitable assessment method or device may be utilized. In some examples, tap testing may be used. In some examples, ultrasonic inspection equipment may be employed to more accurately determine the extent of damage, including location of through-thickness damage. Any suitable ultrasonic test (UT) equipment may be used. One example of suitable UT equipment is a so-called ramp damage checker. This inspection device uses a time-of-flight calculation, calibrated on an undamaged area, to determine depth and location of damaged plies. For example, voids in the panel may indicate damage, such as when crumpled plies separate from each other.

Figure 5:
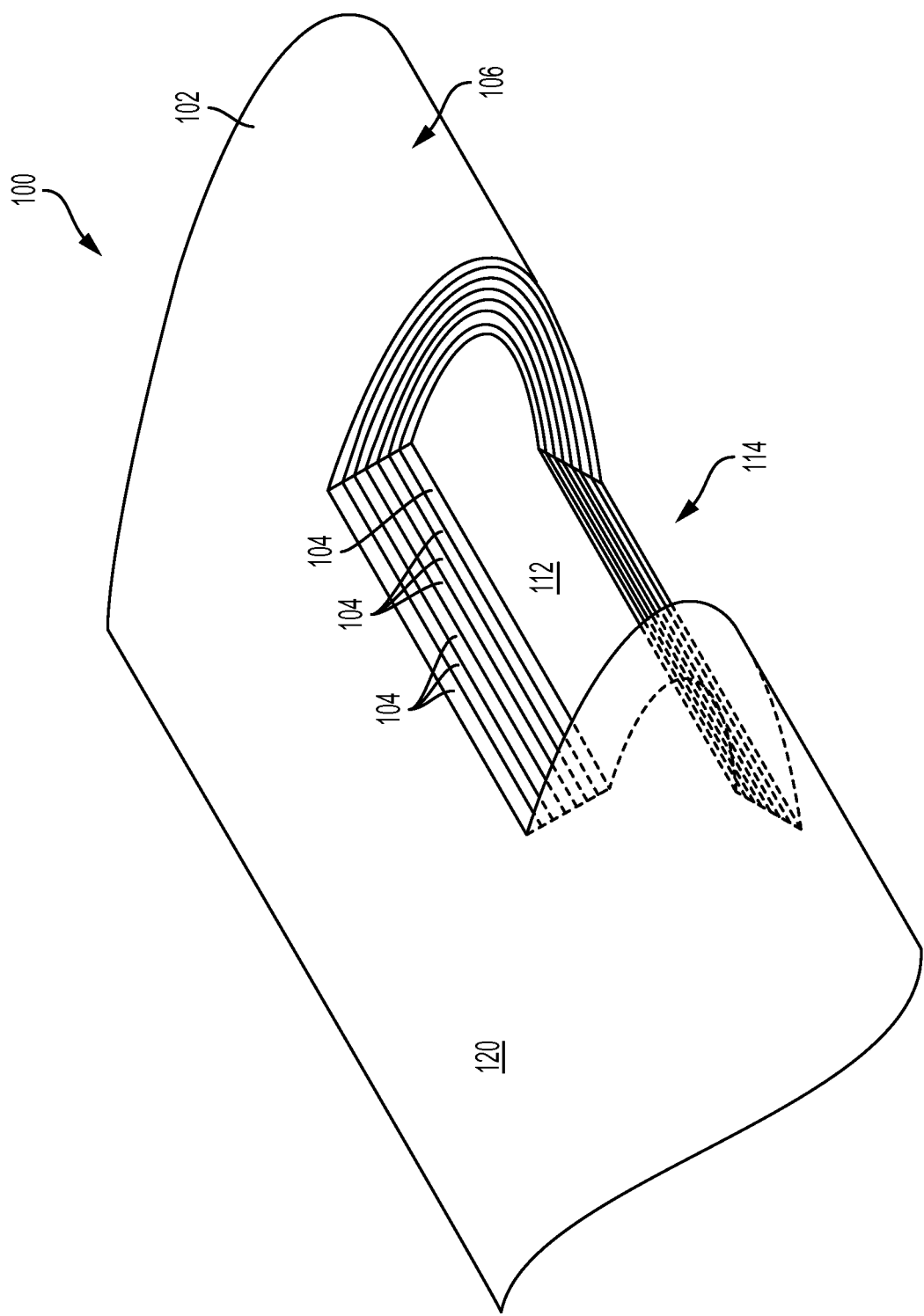
FIG. 5 is a partial isometric view of an illustrative airfoil with a sector removed.

Through-thickness damage may then be removed, e.g., by cutting a sector 110 from leading edge 106. This step may be accomplished using any suitable tool(s) (e.g., a router). FIG. 5 shows an example of how leading edge 106 of airfoil 100 may appear after a sector is removed. As shown in FIG. 5, removal of the damaged sector leaves a hole, opening, or aperture 112 in the airfoil, and a void 114 in the leading edge. Cutting a sector to remove the through-thickness damage generally will not result in complete removal of all damage in area 108. In other words, some portion(s) of the damaged panels may remain in place for intermediate steps of the repair process.

Following the removal of a portion of the damage (e.g., removal of sector 110 containing through-thickness damage), airfoil 100 includes panel 102 having void 114 in leading edge 106. Hole 112 in airfoil 100 may place an interior 116 of the hollow airfoil into fluid communication with an exterior environment 118 and/or exterior surface 120 of panel 102. Interior 116 may correspond to interior 58, described above. Void 114 and/or hole 112 may have any suitable shape and/or size (e.g., rectangular, square, elliptical); see FIGS. 7 and 8.

Figure 6:
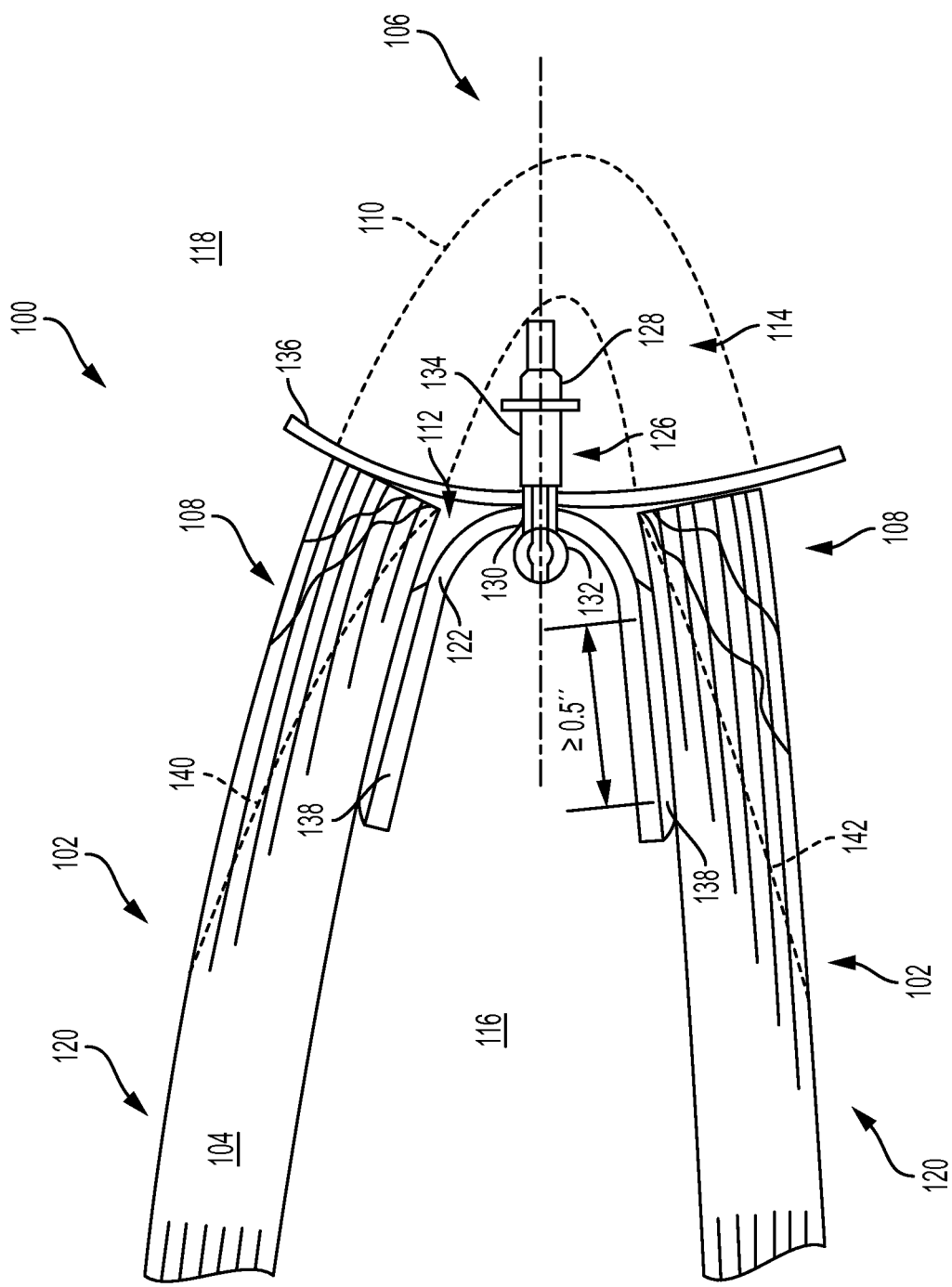
FIG. 6 is a sectional side view of an illustrative airfoil with a sector removed and an exemplary patch clamped in place.

Turning to FIG. 6-8, steps may now be taken to seal hole 112. A flexible patch 122 is inserted into hole 112 in airfoil 100, and pulled against an interior surface 124 of panel 102. Insertion and pulling are facilitated by a clamping tool that is removably attached to the patch. In this example, such a clamp 126 includes a temporary fastener 128 attachable to a small opening 130 in patch 122. Temporary fastener 128 has an insertable portion 132 that attaches in opening 130, and an actuator portion 134 that causes the insertable portion to be selectively released. Temporary fastener 128 may include a so-called cleco (or cleko) fastener, which is well-known in the art. Temporary fastener 128 further attaches to a bracing member 136 for bracing against the sides of void 114 (i.e., against the remaining damaged portions of leading edge 106). Bracing member 136 may include any suitable structure configured to provide a surface against which temporary fastener 128 can be pressed as the fastener pulls patch 122 against interior surface 124. Bracing member 136 may include an elongate strip of metal (e.g., spring steel), as best seen in FIGS. 6 and 8.

Flexible patch 122 may include any suitable material(s). In some examples, composite materials (e.g., cured carbon fiber) and/or fiberglass may be used. Patch 122 is flexible, and may include one or more layers of flexible material, such multiple composite plies (e.g., three or four plies). As shown in FIGS. 6-8, patch 122 is larger than hole 112. Note that FIG. 7 is an alternative example, in which the removal of a sector has left an elliptical hole 106' (other component features in FIG. 7 also use primed versions of the corresponding reference numbers).

Preferably, patch 122 overlaps the perimeter of hole 112 by a sufficient amount to ensure a secure attachment and to seal the hole. Any suitable overlap may be used. For example, patch 122 may overlap the perimeter of hole 112 by at least approximately 0.5 inches, as indicated in FIGS. 6-8. This overlapping portion of patch 122 may be affixed to interior surface 124. For example, an adhesive 138 may be used to adhere patch 122 to interior surface 124. Clamp 126 is used to hold patch 122 in place as the adhesive cures. Temporary fastener 128 may be released and clamp 126 may be removed following a sufficient curing period. Any holes or gaps may be filled with additional adhesive or other filler material, such as potting compound, foaming adhesives, and/or the like, or any combination of these. Accordingly, patch 122 may be used to effectively seal hole 112.

FIG. 6 also shows scarfing lines 140 and 142, which indicate schematically where the airfoil will be tapered in later steps, to remove remaining portions of damaged area 108. The remaining damaged portions may be used in the clamping and patching process, as described and shown in FIG. 6, and therefore may be left in place for those operations.

Following patching of hole 112, airfoil 100 includes panel 102 having void 114 in leading edge 106. Patch 122 is installed or affixed in hole 112, such that the hole is sealed. Portions of damaged area 108 that did not encounter damage through the thickness of panel 102 remain in place. These portions are adjacent to void 114. Central opening 130 may be present in patch 122. However, this opening may be sealed, such as by an adhesive. Sealing of opening 130 may be performed immediately, or in subsequent steps (e.g., when the shaped core is attached, as described below).

Figure 9:
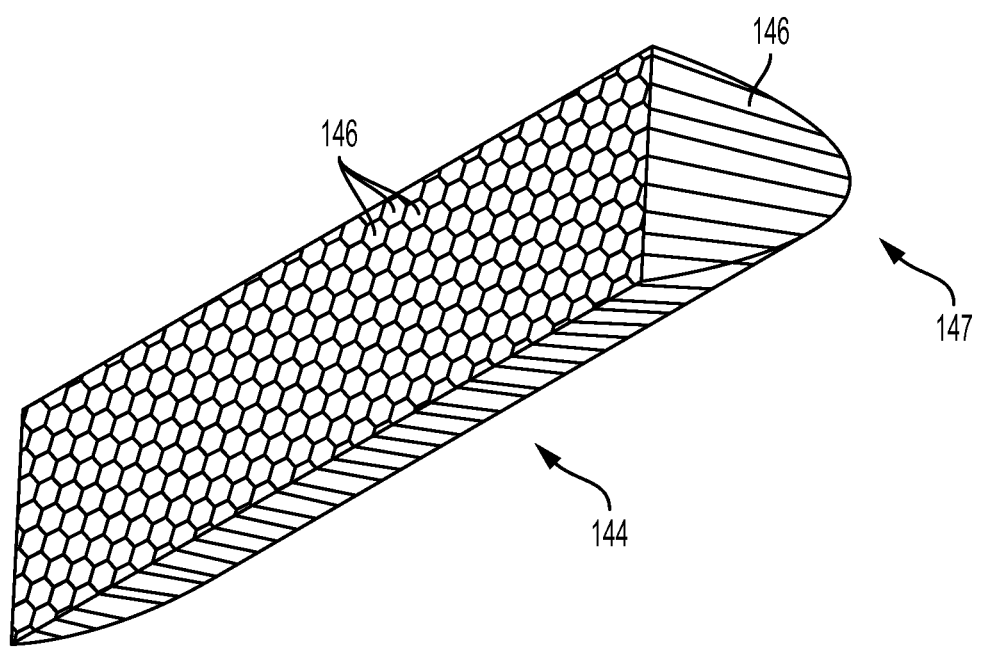
FIG. 9 is an isometric view of an illustrative shaped honeycomb core.
Figure 10:
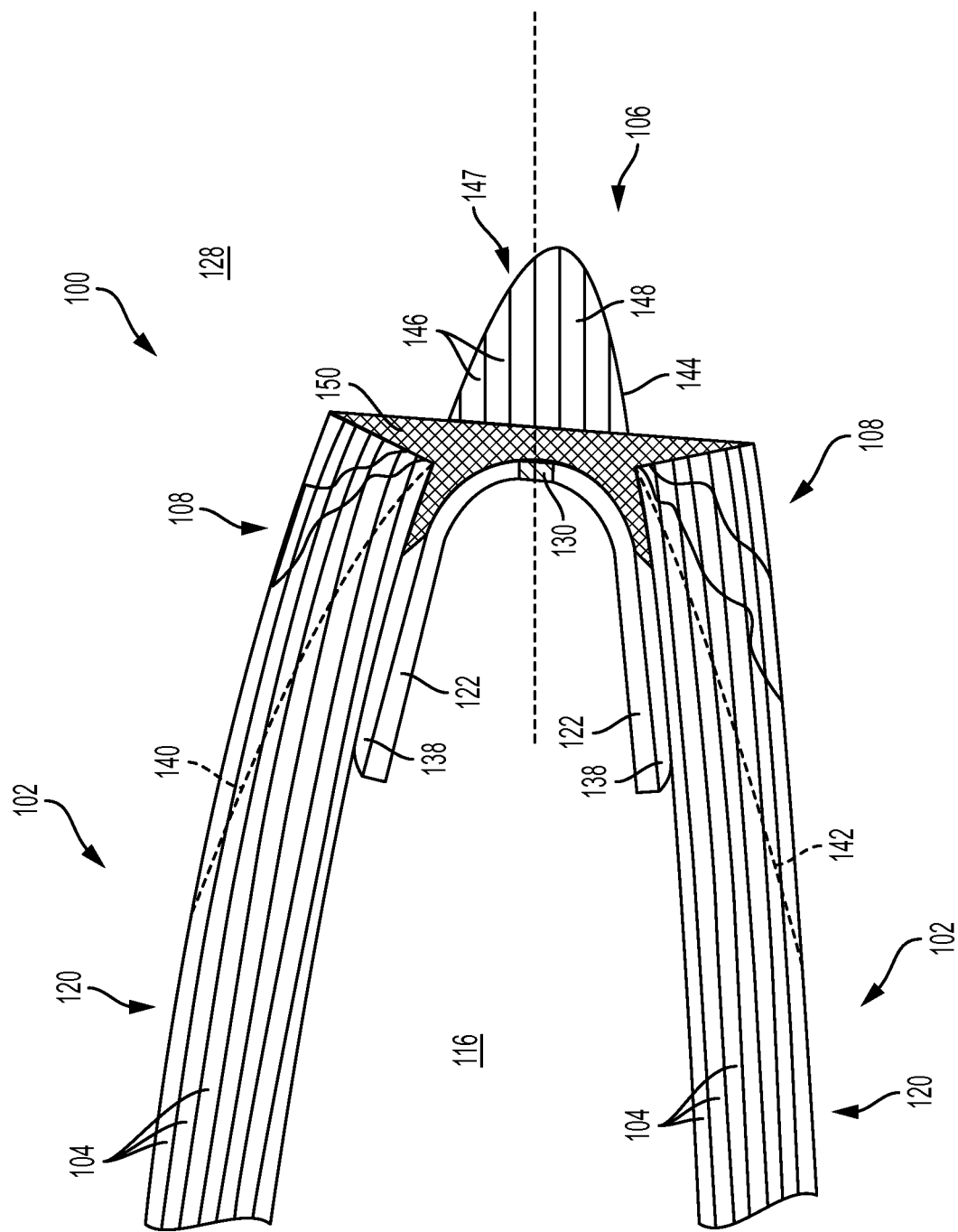
FIG. 10 is a sectional side view of an illustrative airfoil with a sector removed, patch affixed to an interior surface, and a shaped core affixed in the void formed by removing the sector.

Turning to FIGS. 9 and 10, subsequent steps include building up the void area (i.e., the area of deepest damage). For example, such build-up may include affixing a shaped core 144 and/or high-temperature foam in void 114. As shown in FIG. 9, shaped core 144 may include a honeycomb structure shaped and sized to build up the void area, functioning as a base surface (i.e., sacrificial tooling) on which structural composite-material repair plies may be installed.

Shaped core 144 may include any suitable lightweight structure having a plurality of cells. In the example shown in FIGS. 9 and 10, shaped core 144 includes a non-metallic honeycomb structure, having a plurality of tessellated hexagonal cells 146 running fore and aft. Any suitable shape may be utilized. In the examples illustrated in the drawings, shaped core 144 has a curved outer surface 147 generally corresponding to a shape of the leading edge. The honeycomb structure may comprise any suitable materials, such as nylon, graphite, paper, fiberglass, and/or aramid materials, or any combination of these. Other lightweight structural materials may be used. However, non-metallic honeycomb material is well-known and typically available in the aerospace industry, albeit for other applications. One or more void portions (also referred to as interior spaces) of cells 146 may be filled with a foaming adhesive 148 to strengthen the honeycomb structure. Additionally or alternatively, a potting material and/or other adhesive may be used to fill the spaces in the cells.

Shaped core 144 is affixed in void 114 using any suitable adhesive or fixative, thereby attaching the shaped core to the dam formed by patch 122. In some examples, a potting compound 150 is used. Space between the patch and the shaped core may be filled with potting compound 150, as shown in FIG. 10. The honeycomb core structure may be cured with the potting compound, or in separate steps. In some examples, airfoil 100 may be turned vertically during these steps, such that the force of gravity can be used to aid in retention of potting compound 150 and/or shaped core 144 during the assembly and curing process.

Following installation of shaped core 144 and potting compound 150, airfoil 100 appears as shown in FIG. 10. Specifically, airfoil 100 includes panel 102 having a composite-material leading edge 106 from which sector 110 has been removed to form void 114 in the composite material of the leading edge and hole 112 in the airfoil. A dam covering the hole in the airfoil includes patch 122 affixed to an interior periphery of opening or hole 112. Shaped core 144 is fixed in the void by a fixative (e.g., potting compound 150). Portions of area 108 having non-through-thickness damage remain intact, and potting compound 150 may extend onto and/or around those portions.

Figure 11:
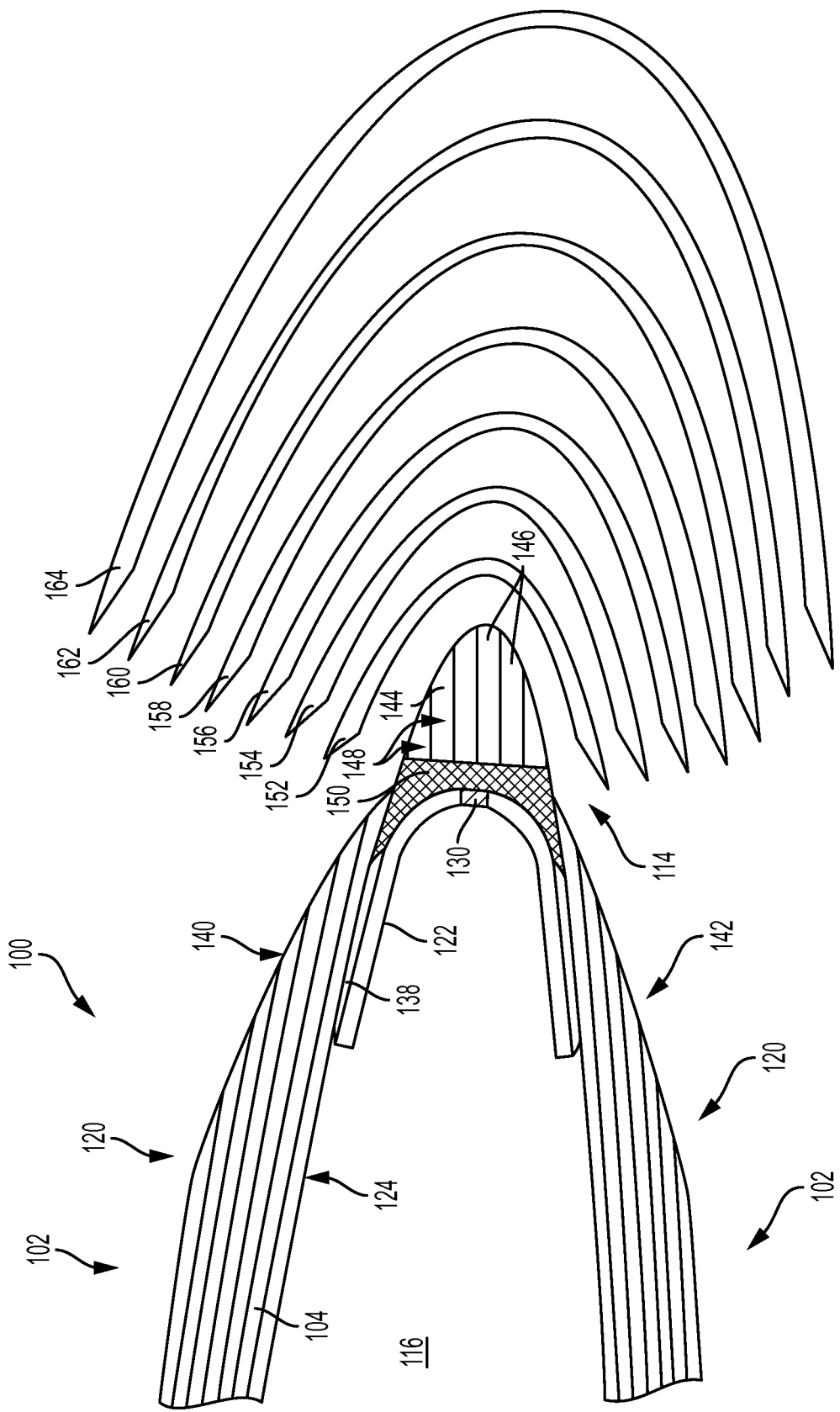
FIG. 11 is a sectional side view of the airfoil of FIG. 10 with remaining damage removed, showing layers of repair material to be compacted onto the airfoil structure.

Turning now to FIG. 11, portions of airfoil 100 may be tapered in a scarfing step, such that the airfoil is fully prepared for installation of repair plies. Tapering may include sanding, grinding, cutting, routing, or any other method configured to remove and/or shape the surface of airfoil 100. In general, potting compound 150 and/or areas of the airfoil adjacent the void and distal to the leading edge are tapered in this part of the process. As shown in FIG. 11, remaining portions of damaged area 108 are removed, resulting in a tapered surface on panel 102.

Sanding or other removal operations may be performed to achieve a selected taper ratio, which may be chosen to properly expose underlying plies 104 of panel 102. Any suitable taper ratio may be used. In some examples, a taper ratio of approximately thirty to one (30:1) may be appropriate. Among other reasons, the selected taper ratio may be chosen to ensure load transfers from one ply to the next in a predictable and desired manner.

Following the sanding or tapering operations, airfoil 100 may appear as shown in the left side of FIG. 11. Specifically, airfoil 100 includes panel 102 having a composite-material leading edge 106 from which sector 110 has been removed to form void 114 in the composite material of the leading edge and opening or hole 112 in the airfoil. A dam covering the hole in the airfoil includes patch 122 affixed to an interior periphery of opening or hole 112. Shaped core 144 is fixed in the void by a fixative (e.g., potting compound 150). All damaged portions of the airfoil have been removed. Areas of the airfoil adjacent the void and distal to the leading edge are tapered in preparation for application of repair plies.

With continuing reference to FIG. 11, a plurality of repair plies 152-164 are then installed onto the prepared airfoil 100. Repair plies 152-164 may include any suitable layers/plies of composite material(s), and may have various orientations. In some examples, the composite material is substantially identical to the composite material of panel 102. Other suitable materials or combinations of materials may be used. For example, film adhesives may be placed between layers to increase bond strength. In some examples, repair plies 152-164 may include various types and forms of carbon fiber reinforced polymer (CFRP) plies.

Repair plies 152-164 are laid up on airfoil 100, including onto shaped core 144, either one at a time or in multiples (e.g., up to four plies at a time). For example, ply 152 may be compacted onto shaped core 144 and panel 102, then ply 154 onto ply 152 and panel 102, then ply 156 onto ply 154 and panel 102, and so on. Each ply may be compacted and/or cured before applying the next. This installation of composite plies is performed using industry-standard processes, and may involve either wet layup or pre-preg methods. In general, each ply or group of plies may be laid down, compacted in place under vacuum, and then cured by applying heat and pressure to the area. Seven plies are shown in FIG. 11. However, more or fewer plies may be utilized, depending on overall thickness and other factors. In some examples, repair plies may be thicker than original plies, for example to allow excess material to be sanded to the proper contour.

Figure 12:
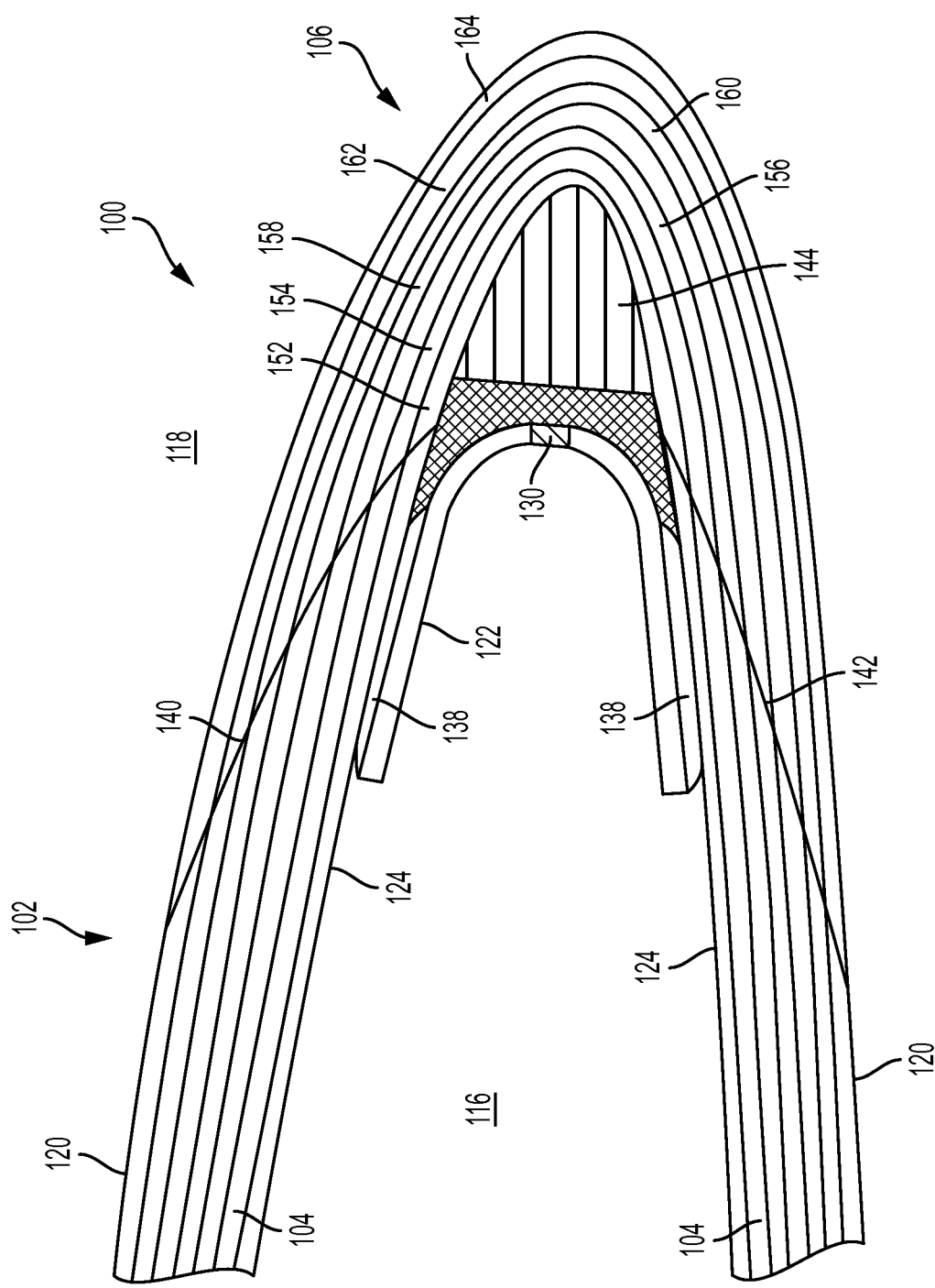
FIG. 12 is a sectional side view of the airfoil of FIG. 11 with the layers of repair material compacted onto the airfoil and contoured to be continuous therewith.

Following installation of repair plies 152-164, one or more of the plies is sanded and/or otherwise smoothed as needed to produce a surface continuous with the undamaged portion of the panel/airfoil. In other words, the repair plies are sanded and smoothed to restore the original shape and continuous outer surface. In some examples, a minimum number of repair plies are required for strength and structural integrity, while remaining plies are used to sand and restore contour. The outer surface may also be repainted and/or other exterior features such as appliqués may be reapplied to restore the original appearance of airfoil 100. Turning to FIG. 12, a fully repaired airfoil 100 is shown in sectional view, with repair plies 152-164 installed, and outermost layer 164 being continuous with exterior surface 120 of airfoil 100.

Figure 13:
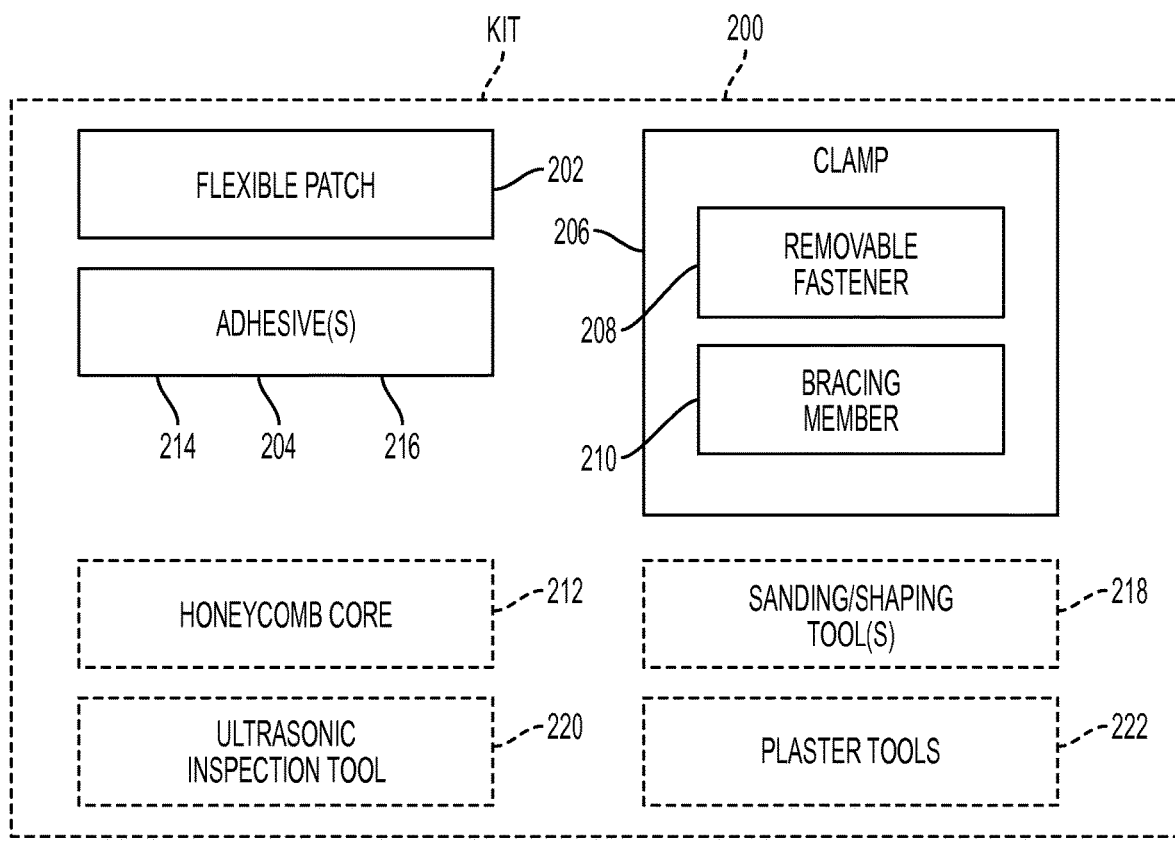
FIG. 13 is a schematic diagram of an illustrative repair kit in accordance with aspects of the present disclosure.

Illustrative Repair Kit:

As shown in FIG. 13, this section describes an illustrative kit containing various devices and materials suitable for use in repair methods in accordance with aspects of the present disclosure.

FIG. 13 is a schematic diagram of a repair kit 200 for repairing a damaged composite-material leading edge of an airfoil or other curved composite-material panel.

Repair kit 200 may include a flexible patch 202, similar to patch 122 described above. Flexible patch 202 may be configured to overlap the periphery of an opening in a leading edge of a curved panel, for example by at least approximately 0.5 inches on all sides. In some examples, flexible patch 202 may comprise one or more layers or plies of fiberglass and/or CFRP material(s).

Repair kit 200 may include an adhesive 204 for attaching flexible patch 202 to an inner surface of the panel. Adhesive 204 may include foaming adhesive and/or potting compound, and may be substantially similar to adhesive 138, described above.

Repair kit 200 may include a clamp 206. Clamp 206 may include any suitable device configured to hold flexible patch 202 against the interior surface of the panel. For example, clamp 206 may include a removable fastener 208 and a bracing member 210. Removable fastener 208 may include a cleco fastener. Bracing member 210 may include any suitable structure configured to span the opening in the leading edge. Bracing member 210 may include a strip or strap of spring steel. In some examples, bracing member 210 may be an elongate rectangular strip.

Removable fastener 208 is attachable to a hole in the patch and to bracing member 210, such that clamp 206 is secured against the panel by the bracing member and pulls the patch against the inner surface of the panel.

Repair kit 200 may include an item of sacrificial tooling 212, attachable to the leading edge of the airfoil to partially fill a void in the leading edge adjacent to the opening therein. Tooling 212 may include a volume of high temperature foam. In some examples, tooling 212 may include a non-metallic honeycomb, such as an aramid block.

Repair kit 200 may include a volume of adhesive 214, for attaching the honeycomb block (tooling 212) to the leading edge. Adhesive 214 may include a potting compound.

Repair kit 200 may include a volume of foaming adhesive 216, injectable into one or more honeycomb voids of block 212.

In some examples, repair kit 200 may include additional tools used in repair processes in accordance with aspects of the present disclosure. For example, sanding and shaping tools 218 may be included. Tools 218 include any suitable tools or devices configured to taper and/or smooth the surfaces of an airfoil at selected stages of repair. For example, sanding tools may be utilized to shape the final contour of the airfoil following installation of repair plies as described above. Repair kit 200 may include other tools utilized at the beginning of the repair process. For example, one or more ultrasonic inspection tools 220 may be included (e.g., a ramp damage checker), as well as one or more plaster tools 222 typically utilized for splash plaster casting.

Figure 15:
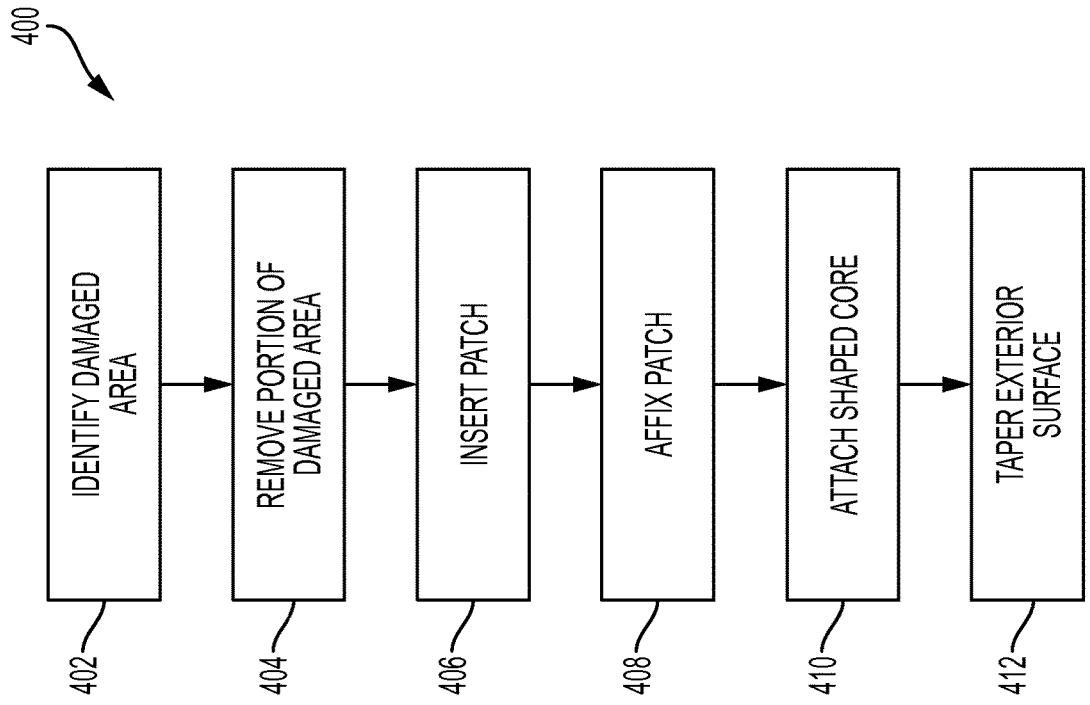
FIG. 15 is a schematic flow chart depicting selected steps of an illustrative method for repairing a contoured composite-material structure.
Figure 14:
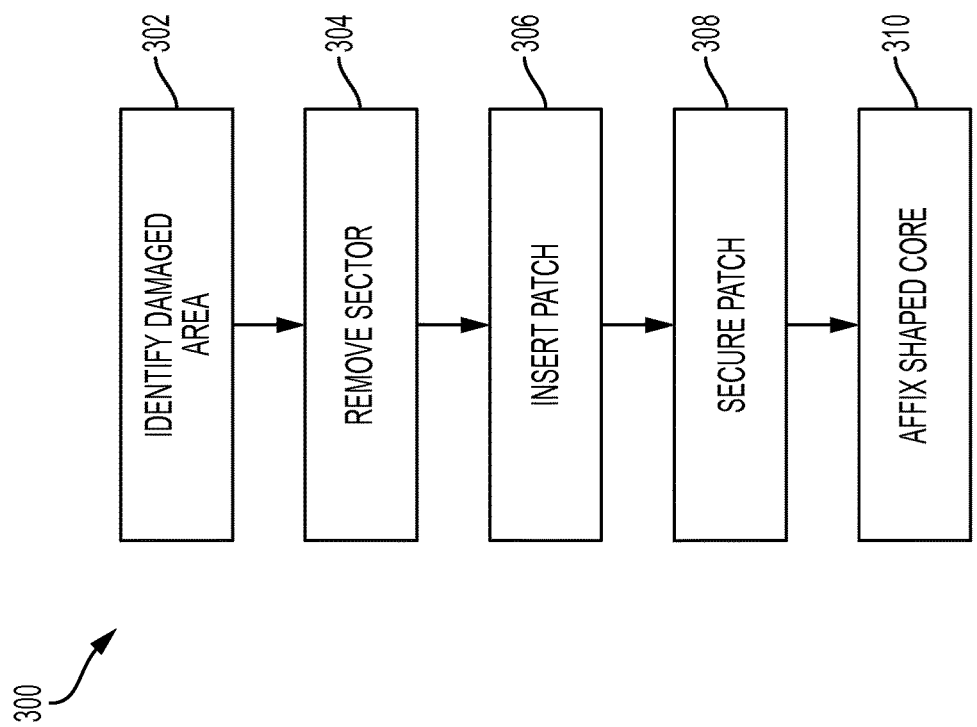
FIG. 14 is a schematic flow chart depicting selected steps of an illustrative method for repairing a damaged composite-material leading edge of an airfoil structure.

Illustrative Methods:

This section describes methods for repairing a leading edge of an airfoil wherein the leading edge comprises a composite material such as CFRP; see FIGS. 14 and 15. These methods may be applicable to other contoured or curved composite-material panels.

Aspects of repair methods, devices, and systems already described may be utilized in the method steps described below. Where appropriate, reference may be made to previously described components and systems that may be used in carrying out each step. These references are for illustration, and are not intended to limit the possible ways of carrying out any particular step of the method.

FIGS. 14 and 15 are flowcharts illustrating operations performed in illustrative methods, and may not recite the complete process or all steps of the respective method. Although various steps of the methods are described below and depicted in FIGS. 14 and 15, the steps need not necessarily all be performed, and in some cases may be performed in a different order than the order shown. Additionally, steps of the methods shown may be combined with other methods and steps, including those described elsewhere in the present disclosure.

FIG. 14 depicts an illustrative method 300 for repairing a leading edge of an airfoil. Step 302 of method 300 includes identifying a damaged area of a leading edge of a hollow airfoil, the leading edge including a curved panel of composite material and defining a thickness extending from an exterior surface of the panel to an interior surface of the panel. This thickness is analogous to thickness 109, described above.

Step 304 of method 300 includes removing a sector of the leading edge corresponding to the damaged area, the removed sector including the thickness of the panel, thereby forming a void in the leading edge and an opening in the airfoil. Removing the sector may include removing some or all through-thickness damage.

Step 306 of method 300 includes inserting a flexible patch through the opening, the patch being larger than the opening. The flexible patch may comprise a plurality of plies of composite material.

Step 308 of method 300 includes securing the patch to the interior surface of the leading edge, such that the patch covers the opening. In some examples, securing the patch to the interior surface includes holding the patch in place using a temporary fastener and adhering an edge portion of the patch to an interior periphery of the opening or hole. In some examples, holding the patch in place includes bracing the temporary fastener against a remaining portion of the damaged area of the leading edge.

Step 310 of method 300 includes affixing a shaped core in the void formed by removing the sector. The shaped core may include a non-metallic honeycomb structure, substantially similar to shaped core 144. In some examples, affixing the shaped core includes filling a space between the patch and the shaped core with an adhesive, such as a potting compound.

Method 300 may include additional steps, such as tapering areas of the panel adjacent the void and distal to the leading edge. This tapering may include sanding the panel to complete removal of the damaged area.

Method 300 may also include filling the void by sequentially compacting a plurality of repair plies onto the shaped core. One or more of the repair plies may be sanded or otherwise shaped to produce a surface continuous with an undamaged portion of the airfoil.

Turning to FIG. 15, an illustrative method 400 for repairing a contoured composite-material structure is shown. Step 402 of method 400 may include identifying a damaged area of a vertex region of a curved, composite-material panel, the panel defining an exterior surface, an interior surface, and a thickness. In some examples, the panel comprises carbon fiber reinforced polymer. In some examples, the panel comprises a plurality of plies of composite material. Identifying the damaged area may include using an ultrasonic testing device, such as a ramp damage checker.

Step 404 of method 400 may include removing a full-thickness portion of the damaged area, thereby forming a void in the vertex region and an aperture in the panel.

Step 406 of method 400 may include inserting a flexible patch into the aperture.

Step 408 of method 400 may include covering the aperture by affixing the patch to the interior surface of the panel. Affixing the patch may include clamping the patch in place. In some examples, clamping the patch includes forming a hole in the patch, installing a cleco fastener in the hole, and bracing the cleco against the panel.

Step 410 of method 400 may include attaching a shaped core in the void, the shaped core having an outer contour corresponding to the vertex region. Attaching the shaped core may include fixing the shaped core in the void using an adhesive. In some examples, the adhesive comprises a potting compound.

Step 412 of method 400 may include removing remaining portions of the damaged area by tapering the exterior surface of the panel adjacent the void and distal to the vertex region.

Method 400 may include additional steps, such as installing one or more plies of composite material in the void on the shaped core. The installed one or more plies may be sanded to conform to an original curved surface of the vertex region.

SELECTED EXAMPLES

This section describes additional aspects and features of methods and devices for repairing contoured composite panels, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method for repairing a leading edge of a hollow airfoil, the method comprising: identifying a damaged area of the leading edge of the hollow airfoil, the leading edge including a curved panel of composite material and defining a thickness extending from an exterior surface of the panel to an interior surface of the panel; removing a sector of the leading edge corresponding to the damaged area, the removed sector including the thickness of the panel, thereby forming a void in the leading edge and an opening in the airfoil; inserting a flexible patch through the opening, the patch being larger than the opening; securing the patch to the interior surface of the leading edge, such that the patch covers the opening; and affixing a shaped core in the void formed by removing the sector.

A1. The method of paragraph A0, further including tapering the panel adjacent the void and distal to the leading edge.

A2. The method of paragraph A1, wherein tapering includes sanding the panel to complete removal of the damaged area.

A3. The method of any of paragraphs A0 through A2, further including filling the void by sequentially compacting a plurality of repair plies onto the shaped core.

A4. The method of paragraph A3, further including sanding one or more of the repair plies to produce a surface continuous with an undamaged portion of the airfoil.

A5. The method of any of paragraphs A0 through A4, wherein the shaped core comprises a non-metallic honeycomb structure.

A6. The method of any of paragraphs A0 through A5, wherein affixing the shaped core includes filling a space between the patch and the shaped core with a potting compound.

A7. The method of any of paragraphs A0 through A6, wherein securing the patch to the interior surface includes holding the patch in place using a temporary fastener and adhering an edge portion of the patch to an interior periphery of the opening.

A8. The method of paragraph A7, wherein holding the patch in place includes bracing the temporary fastener against a remaining portion of the damaged area of the leading edge.

A9. The method of any of paragraphs A0 through A8, wherein the flexible patch comprises a plurality of plies of composite material.

A10. The method of any of paragraphs A0 through A9, wherein removing the sector includes removing all through-thickness damage.

B0. A repaired airfoil structure comprising: a composite-material leading edge of a hollow airfoil from which a sector has been removed to form a void in the composite material of the leading edge and a hole in the airfoil; a dam covering the hole in the airfoil, the dam including one or more layers of flexible material affixed to an interior periphery of the hole; and a shaped core fixed in the void by a fixative; wherein the airfoil is tapered adjacent the void and distal to the leading edge.

B1. The structure of paragraph B0, wherein a space between the shaped core and the dam is filled with the fixative.

B2. The structure of paragraph B1, wherein the fixative comprises a potting compound.

B3. The structure of any of paragraphs B0 through B2, wherein the shaped core comprises a non-metallic honeycomb structure having a curved outer surface.

B4. The structure of paragraph B3, wherein one or more interior spaces of the shaped core are at least partially filled with a foaming adhesive.

B5. The structure of any of paragraphs B0 through B4, wherein the taper of the airfoil has a taper ratio of at least approximately 30:1.

B6. The structure of any of paragraphs B0 through B5, wherein the leading edge comprises carbon fiber reinforced polymer (CFRP).

B7. The structure of any of paragraphs B0 through B6, further including a layer of CFRP compacted onto the shaped core and the airfoil.

B8. The structure of any of paragraphs B0 through B7, further including a plurality of layers of CFRP compacted onto the shaped core and the tapered areas adjacent the void.

B9. The structure of paragraph B8, wherein an outermost layer of the plurality of layers is continuous with an outer surface of the airfoil.

C0. A repair kit for repairing a damaged composite-material leading edge of an airfoil, the repair kit comprising: a flexible patch configured to overlap the periphery of an opening in a leading edge of a curved panel by at least approximately 0.5 inches on all sides, the panel comprising a plurality of plies of composite material; an adhesive for attaching the patch to an inner surface of the panel; and a clamp including a removable fastener and a bracing member configured to span the opening in the leading edge, the fastener being attachable to a hole in the patch and to the bracing member, such that the clamp is secured against the panel by the bracing member and pulls the patch against the inner surface of the panel.

C1. The repair kit of paragraph C0, wherein the removable fastener comprises a cleco.

C2. The repair kit of any of paragraphs C0 through C1, wherein the brace comprises a strip of spring steel.

C3. The repair kit of any of paragraphs C0 through C2, wherein the flexible patch comprises carbon fiber reinforced polymer (CFRP).

C4. The repair kit of paragraph C3, wherein the flexible patch comprises a plurality of plies.

C5. The repair kit of paragraph C4, wherein the plurality of plies numbers four or fewer.

C6. The repair kit of any of paragraphs C0 through C5, further including an item of sacrificial tooling attachable to the leading edge of the airfoil to partially fill a void in the leading edge adjacent to the opening therein.

C7. The repair kit of paragraph C6, wherein the item of sacrificial tooling comprises a volume of high temperature foam.

C8. The repair kit of paragraph C6, wherein the item of sacrificial tooling comprises a non-metallic honeycomb block.

C9. The repair kit of paragraph C8, further including a volume of adhesive for attaching the block to the leading edge.

C10. The repair kit of paragraph C9, wherein the adhesive comprises a potting compound.

C11. The repair kit of paragraph 08, further including a volume of foaming adhesive injectable into one or more honeycomb voids of the block.

D0. A method for repairing a contoured composite-material structure, the method comprising: identifying a damaged area of a vertex region of a curved, composite-material panel, the panel defining an exterior surface, an interior surface, and a thickness; removing a full-thickness portion of the damaged area, forming a void in the vertex region and an aperture in the panel; inserting a flexible patch into the aperture; covering the aperture by affixing the patch to the interior surface of the panel; attaching a shaped core in the void, the shaped core having an outer contour corresponding to the vertex region; and removing remaining portions of the damaged area by tapering the exterior surface of the panel adjacent the void and distal to the vertex region.

D1. The method of paragraph D0, wherein the panel comprises carbon fiber reinforced polymer.

D2. The method of any of paragraphs D0 through D1, wherein identifying the damaged area includes using an ultrasonic testing device.

D3. The method of any of paragraphs D0 through D2, wherein the panel comprises a plurality of plies of composite material.

D4. The method of any of paragraphs D0 through D3, wherein affixing the patch includes clamping the patch in place.

D5. The method of paragraph D4, wherein clamping the patch includes forming a hole in the patch, installing a cleco fastener in the hole, and bracing the cleco fastener against the panel.

D6. The method of any of paragraphs D0 through D5, wherein attaching the shaped core includes fixing the shaped core in the void using an adhesive.

D7. The method of paragraph D6, wherein the adhesive comprises a potting compound.

D8. The method of any of paragraphs D0 through D7, further including installing one or more plies of composite material in the void on the shaped core.

D9. The method of paragraph D8, further including sanding the installed one or more plies to conform to an original curved surface of the vertex region.

Advantages, Features, Benefits

The different embodiments of the repair methods and related systems and devices described herein provide several advantages over known solutions for repairing contoured composite panels such as composite-material leading edge regions of airfoils. For example, illustrative embodiments of repair methods described herein allow repair of complex composite structures with through-thickness damage in areas of limited accessibility, including restoration to minimum required strengths.

Additionally, and among other benefits, illustrative embodiments of the repair methods described herein allow sealing of cavity regions having highly contoured surfaces with limited access from one side.

Using a concept known as "design for reparability," structural engineers may design a structure with excess capability, such that effective repairs can be performed with a minimum number of repair plies. The minimum number will be less than the original volume removed. This allows additional plies above the minimum to be sanded down or otherwise modified to restore the desired surface. Repairs in accordance with the present disclosure, along with the design for reparability concept, allow surfaces to be repaired such that there is little or no aerodynamic performance reduction in an airfoil.

Additionally, and among other benefits, illustrative embodiments of the repair methods described herein allow repairs to be performed without any additional specialized training.

Additionally, and among other benefits, illustrative embodiments of the repair methods described herein allow repairs that are typically far more economical than replacement, and which can be performed within the time it would take to order and obtain a replacement part. Materials and processes may be used that are readily available and understood to the industry, although they are combined and applied in novel ways, as described above.

No known system or device can perform these functions, particularly with regard to hollow airfoils accessible from only one side of the composite panel. Thus, the illustrative embodiments described herein are particularly useful for repair of composite-material airfoils, such as winglets. However, not all embodiments described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for repairing a composite-material structure, the method comprising:
    identifying a damaged area of a region of a composite-material panel, the panel defining an exterior surface, an interior surface, and a thickness;
    removing a full-thickness portion of the damaged area, forming a void in the region and an aperture in the panel;
    inserting a flexible patch into the aperture;

covering the aperture by affixing the patch to the interior surface of the panel, including clamping the patch in place with a temporary fastener and then removing the temporary fastener; and subsequently attaching a shaped core in the void, the shaped core having an outer contour corresponding to the region.

2. The method of claim 1, wherein the panel comprises carbon fiber reinforced polymer.

3. The method of claim 1, wherein identifying the damaged area includes using an ultrasonic testing device.

4. The method of claim 1, wherein clamping the patch includes forming a hole in the patch, installing the temporary fastener in the hole, and bracing the temporary fastener against the panel.

5. The method of claim 4, further including filling the hole in the patch with an adhesive, after removing the temporary fastener.

6. The method of claim 1, wherein attaching the shaped core includes fixing the shaped core in the void using an adhesive.

7. The method of claim 1, further including installing one or more plies of composite material in the void on the shaped core.

8. A method for repairing a hollow airfoil, the method comprising:

identifying a damaged area of the hollow airfoil, the airfoil including a panel of composite material and defining a thickness extending from an exterior surface of the panel to an interior surface of the panel;

removing a sector of the panel corresponding to the damaged area, the removed sector including the thickness of the panel, thereby forming a void in the panel and an opening in the airfoil;

inserting a flexible patch through the opening, the patch being larger than the opening;

securing the patch to the interior surface of the panel with an adhesive, such that the patch covers the opening;

curing the adhesive; and subsequently affixing a shaped core in the void formed by removing the sector.

9. The method of claim 8, further including tapering the panel adjacent the void.

10. The method of claim 8, further including filling the void by sequentially compacting a plurality of repair plies onto the shaped core.

11. The method of claim 8, wherein the shaped core comprises a non-metallic honeycomb structure.

12. The method of claim 8, wherein affixing the shaped core includes filling a space between the patch and the shaped core with a potting compound.

13. The method of claim 8, wherein securing the patch includes using a temporary fastener and adhering an edge portion of the patch to an interior periphery of the opening.

14. The method of claim 13, wherein securing the patch further includes bracing the temporary fastener against a remaining portion of the damaged area of the panel.

15. A method for repairing a composite-material structure, the method comprising:

identifying a damaged area of a region of a composite-material panel, the panel defining an exterior surface, an interior surface, and a thickness;

removing a full-thickness portion of the damaged area, forming a void in the region and an aperture in the panel;

inserting a flexible patch into the aperture;

covering the aperture with the patch;

forming a hole in the patch;

installing a temporary fastener in the hole;

bracing the temporary fastener against the panel;

removing the temporary fastener; and subsequently attaching a shaped core in the void, the shaped core having an outer contour corresponding to the damaged area.

16. The method of claim 15, wherein attaching the shaped core includes fixing the shaped core in the void using an adhesive.

17. The method of claim 16, wherein fixing the shaped core in the void using an adhesive includes filling a space between the shaped core and the flexible patch with the adhesive.

18. The method of claim 15, further including compacting a plurality of layers of carbon fiber reinforced polymer onto the shaped core and the panel.

19. The method of claim 15, further including at least partially filling one or more interior spaces of the shaped core with a foaming adhesive.

20. The method of claim 8, wherein the panel comprises carbon fiber reinforced polymer.

* * * * *